UNITED STATES PATENT OFFICE.

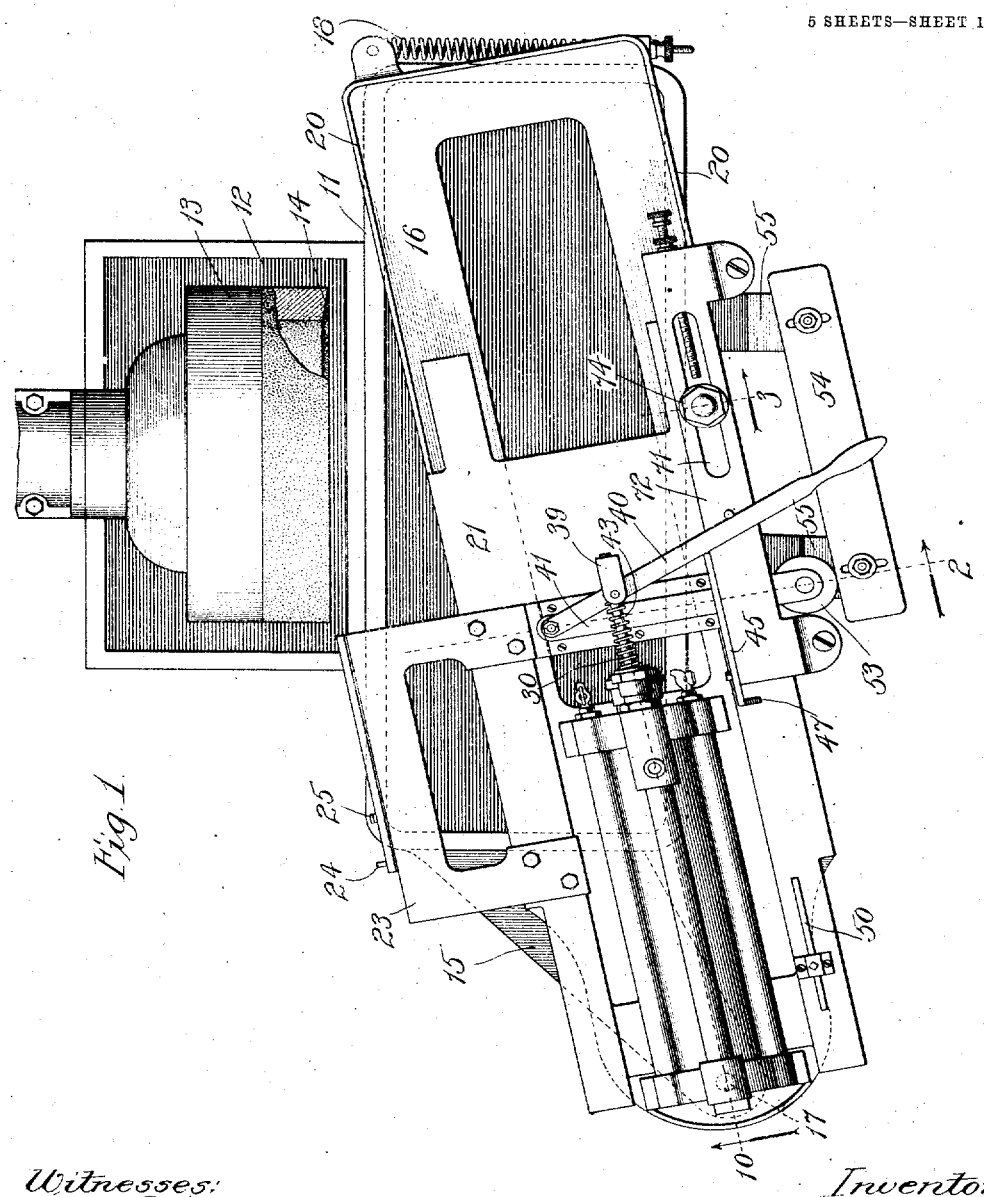

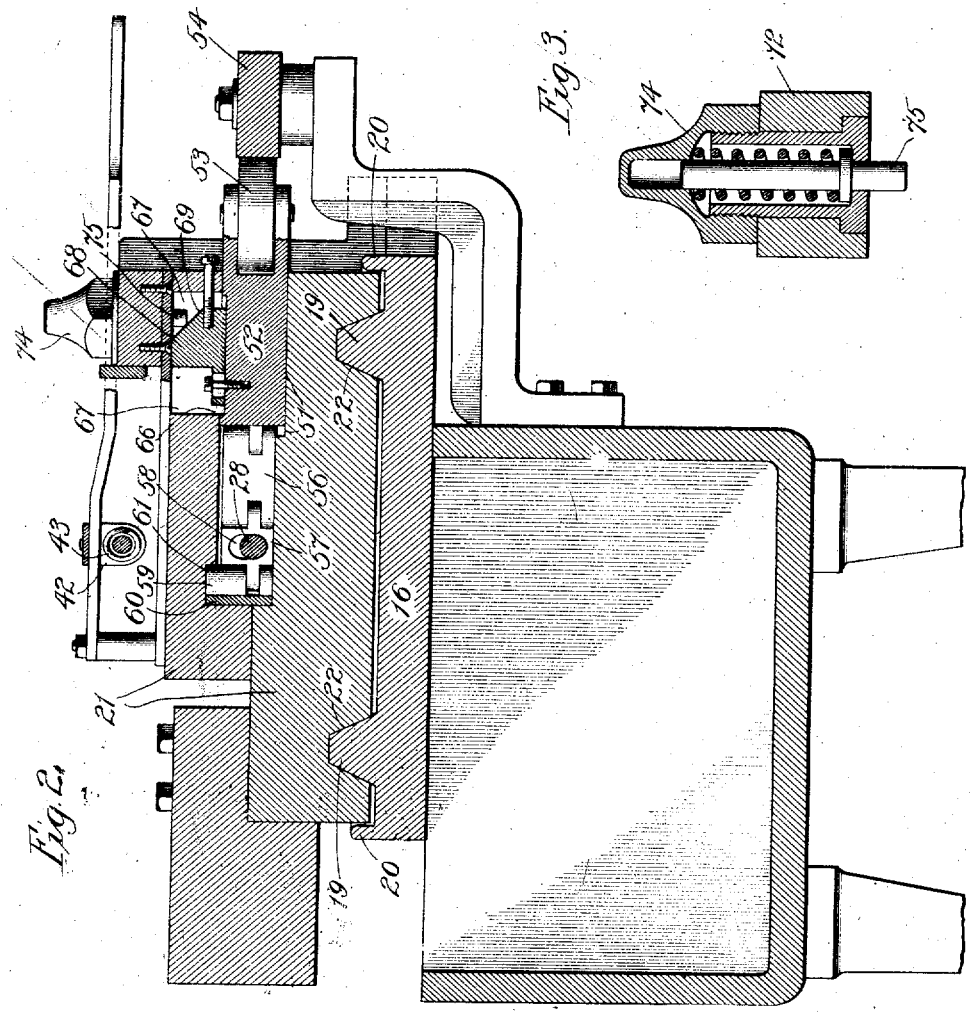

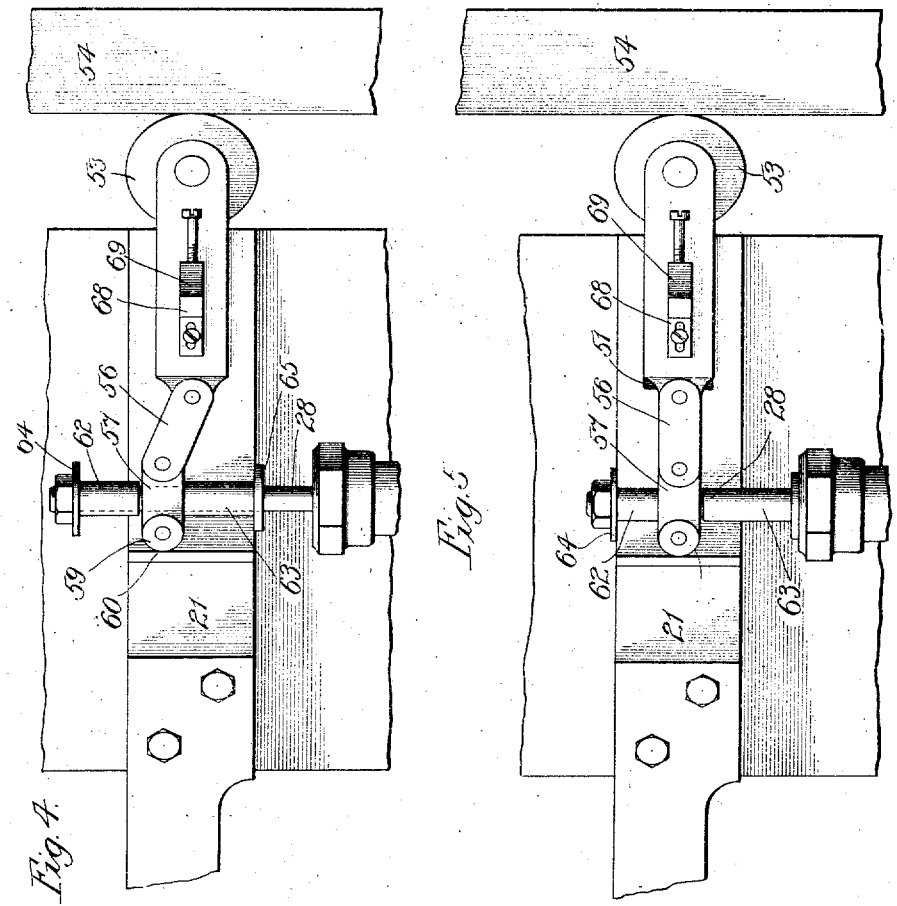

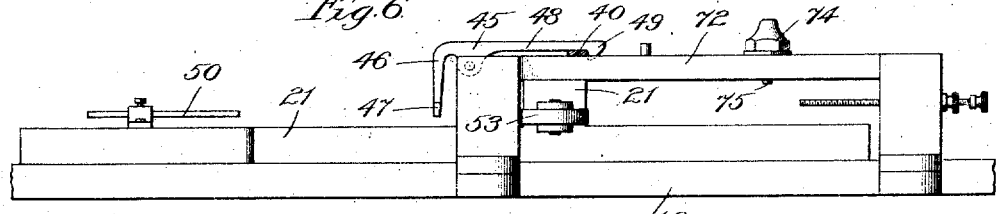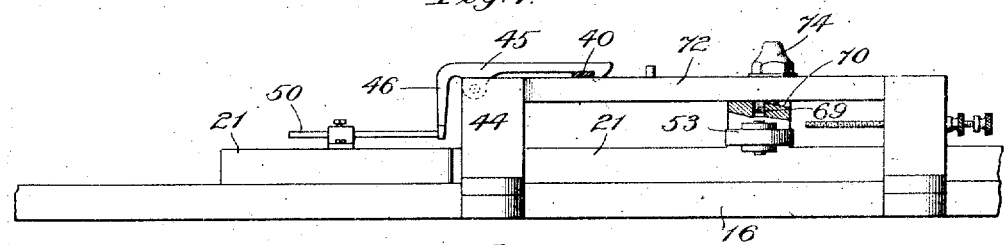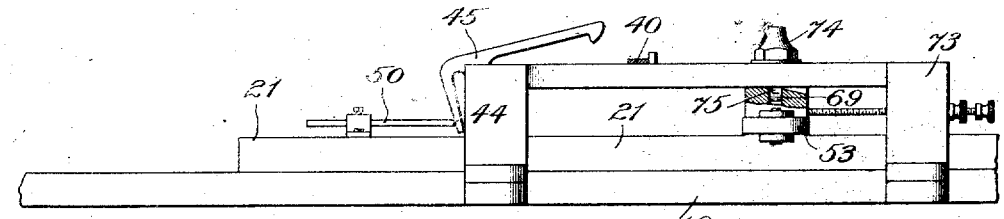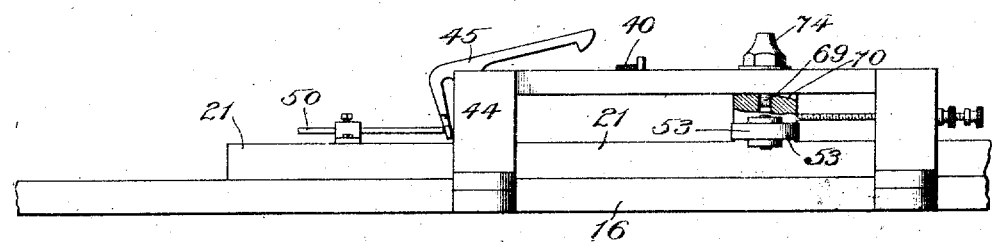

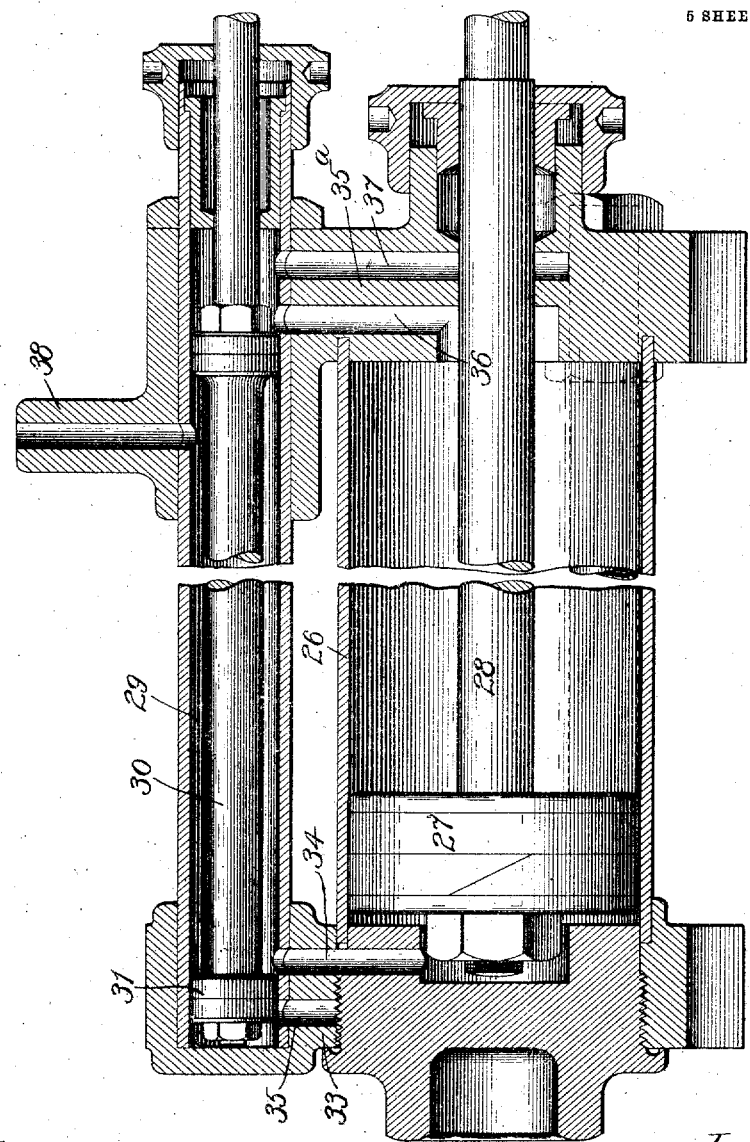

WILLIAM J. BASTIAN AND FRANK GRANITZ, OF CHICAGO, ILLINOIS, ASSIGNORS TO AMERICAN CUTLERY COMPANY, OF CHICAGO, ILLINOIS, A CORPORATION OF ILLINOIS.

CUTLERY-GRINDING MACHINE.

No. 910,350.      Specification of Letters Patent.      Patented Jan. 19, 1909.

Application filed November 15, 1907. Serial No. 402,254.

*To all whom it may concern:*

Be it known that we, WILLIAM J. BASTIAN and FRANK GRANITZ, citizens of the United States, residing at Chicago, in the county of Cook and State of Illinois, have invented a new and useful Improvement in Cutlery-Grinding Machines, of which the following is a specification.

Our invention relates to improvements in cutlery-grinding machines of the class in which a work-holder is mounted on the frame of the machine in a manner to adapt it to be reciprocated and move work held therein across and in contact with a grinding-wheel.

The principal object of our invention is to reduce to the minimum the amount of wear upon those parts of the machine which are subjected in a great degree to water and emery during the operation of the machine, and other objects are to provide novel means for controlling the reciprocating movement of the work-holder, and novel means for effecting the movement of the work-holder toward and away from the grinding-wheel.

Our invention is illustrated in the accompanying drawings, in which—

Figure 1 is a plan view of a cutlery-grinding machine embodying our invention; Fig. 2 is a section taken through the parts of the machine at a point indicated by the line 2 showing the parts of the machine in the relative positions they assume when the work-holder is moved to a point short of the limit of its forward stroke; Fig. 3 is an enlarged section taken at the line 3 on Fig. 1 and viewed in the direction of the arrow; Fig. 4 is a broken plan view of a portion of the machine shown in Fig. 1 showing the mechanism for moving the work-holder carrying-bed relative to the grinding-wheel, the covering-plate for these parts being removed, this view showing these parts in the position they assume during the forward movement of the work-holder; Fig. 5 is a view similar to that illustrated in Fig. 4, the parts of the machine in this view being shown in the positions they assume while the work-holder is traveling to return position; Figs. 6 to 9 inclusive are broken views in side elevation showing details of the mechanism for controlling the forward and return movements of the work-holder and of parts of the mechanism for controlling the movement of the work-holder toward and away from the grinding-wheel, these views showing different positions which these parts assume intermediate the starting of the machine to move the work-holder forward and the starting of the work-holder on its return movement; and Fig. 10 is an enlarged, broken section taken at the line 10 on Fig. 1 and viewed in the direction of the arrow.

The frame 11 of the machine illustrated, which carries the operative parts of the machine, has formed in it a receptacle 12 for water in which a grinding wheel 13 journaled on the frame rotates. The grinding-wheel is of a common form having its grinding-surface, which is in the form of an annulus, tapered toward the axis upon which the wheel rotates. A bracket 15 fastened on one end of the frame 11 has a bed 16 pivoted to it, as indicated at 17. This bed rests upon the top of the frame 11 and is adapted to be swung upon the pivot 17 against the action of a spring 18 secured at one of its ends to the opposite end of the bed and at its other end to the frame 11, this spring tending normally to swing the bed away from the grinding-wheel. The top-surface of the bed 16 is provided with longitudinally-extending parallel tongues 19 preferably of frusto-conical shape in cross-section, as represented in Fig. 2, and also with vertical flanges 20 at its marginal edges.

A carriage 21, provided on its under surface with grooves 22 of a shape in cross-section corresponding with that of the tongues 19 and spaced apart to register therewith, is mounted flatwise on the bed 16 between the flanges 20 to be reciprocated on the tongues in the manner and for the purpose hereinafter described, the carriage being of a length sufficient to cause it at its groove-equipped portions to cover the tongues 19 throughout the reciprocations of the carriage and thereby prevent access to the bearing-surfaces, during the operation of the machine, of water and emery. Secured to the carriage 21 to extend beyond a side of the bed 16 is a work-holder 23 which as shown is provided with the usual pin 24 and hook 25 for releasably holding in position on the work-holder the work to be ground.

In the operation of the machine the carriage 21 is reciprocated on the bed 16 to cause the work-holder to be moved back and forth across the grinding-surface 14 of the wheel in the machine illustrated, the parts being so arranged, as hereinafter described, as to cause the work to be carried forward out of contact with the grinding-wheel and in contact therewith during its return movement.

The machine illustrated employs fluid pressure means for reciprocating the carriage and work-holder, but as these particular means form no part of the present invention they are described in general only. These means comprise a cylinder 26, a piston 27 in the cylinder, a piston-rod 28 connected with the piston at its one end and at its outer end with the carriage 21 in a manner hereinafter described, for reciprocating it, and a valve-chamber 29 containing a valve-rod 30 carrying two spaced pistons 31 and 32. The head 33 of the cylinder 26 contains a passage 34 connecting the cylinder 26 with the valve-chamber 29 at one end of the cylinder, and another passage 35 which leads from the valve-chamber to the exhaust, not shown. The head 35$^a$ at the opposite end of the cylinder contains passages 36 and 37 connecting the interior of the cylinder with the valve-chamber and the chamber with the exhaust (not shown), respectively, an inlet-pipe 38 for the fluid pressure, leading from a suitable source of supply (not shown) to the valve-chamber. The pistons 31 and 32 are so arranged on the rod 30 as to cause the pressure-fluid to enter at one end of the cylinder 26 while the spent-fluid is exhausting at the other end of the cylinder, thereby causing the piston in the cylinder to be reciprocated by shifting the rod 30.

The illustrated machine is caused to automatically return the work-holder to its normal position by the following described construction: The outer end of the valve-rod 30 is secured to a block 39, which latter has pivotal connection with an operating lever 40 fulcrumed at one end to a plate 41 rigid with the bed, and encircling the rod 30 and confined between the end of the valve-chamber 29 and a downwardly-turned flange 42 on the block is a spring 43 which tends to normally maintain the rod 30 and lever 40 in the position illustrated in Fig. 1, in which the pistons 31 and 32 are in position to introduce fluid into the end of the cylinder nearest the grinding-wheel and to exhaust the spent fluid at its opposite end. Pivoted on a standard 44 is a bell-crank lever 45 having a depending arm 46 provided with a lateral projection 47 extending into the path of means, hereinafter described, for tilting the bell-crank 45 when the work-holder reaches the limit of its forward stroke. The other arm 48 of this lever is heavier than its shorter arm 46 and extends approximately horizontally, its outer end being provided with a shoulder 49 for engagement with the lever 40 when the latter is swung upon its pivot into registration with the shoulder for moving the valve-rod 30 into position for effecting introduction into the cylinder 26 of fluid-pressure for driving the piston forward. Thus, assuming the parts of the machine to be in the positions represented in Fig. 1, to start it the operating lever 40 is swung against the action of the spring 43 to cause the lever to drop at its shoulder upon the lever 40 for engaging the latter and releasably holding it in position for causing the piston 27 and with it the work-holder to be driven forward. As the work-holder nears the limit of its forward stroke a rod 50 adjustably mounted on the carriage 21 engages with the depending arm 46 of the lever 45 and tilts the latter, thereby disengaging the shoulder 49 from the lever 40 and causing the latter to return, under the action of the spring 43, to the position illustrated in Fig. 1, in which the fluid-pressure is caused to enter the end of the cylinder nearest to the grinding-wheel and the exhaust of the spent-fluid to take place from the opposite end thereof, thereby drawing the work-holder toward the cylinder.

As before stated, the machine is constructed in a manner to cause the work to be moved forward out of contact with the grinding-wheel and against it during its return movement, the means for effecting this operation being as follows: Slidably confined in a recess 51 in the carriage 21, and extending at approximately a right angle to the work-holder 23, is a block 52 provided on its outer end with a roller 53 adapted to bear, in a manner hereinafter described, against a guide-bar 54 adjustably mounted on brackets 55 extending from the frame 11. The block 52 has pivotally connected to it at its inner end a link 56, which latter is pivotally connected with a second link 57 provided centrally with an opening 58 through which the outer end of the piston-rod 28 extends to be movable therein, the link 57, which with the link 56 forms a knuckle, carrying a roller 59 adapted to bear against the vertical wall 60 of a recess 61 in the carriage 21 in which the links 56 and 57 and roller 59 are confined. The outer end of the piston-rod 28 carries rigid sleeves 62, 63 spaced apart on opposite sides of the link 57 a distance somewhat greater than the thickness of said link, and beyond these sleeves at their opposite ends are provided disks 64 and 65 of a diameter greater than the height of the recess 61 containing the links. Thus, when the rod 28 is moved forward the sleeve 63 abuts against the link 57 and carries the latter forward without moving the carriage 21 until the disk 65 engages the carriage, whereupon further movement of the rod 28 in the same direction moves the carriage with it. When the direction of the movement of the rod 28 is reversed the latter moves in the opening 58 in the link 57 until the sleeve 62 engages this link, whereupon the latter is moved in the recess 61 with the rod 28, until the disk 64 engages the carriage 21, whereupon further movement of the rod 28 in the same direction causes the carriage to travel with it. The rollers 53 and 59 are caused to bear constantly against the guide-bar 54 and vertical wall 60, respectively, through the medium of the spring 18. Thus, when the knuckle collapses from the straightened condition represented in Fig. 5 to the condition represented in Fig. 4, the carriage 21 and with it the workholder and bed 16 are caused to be swung away from the grinding-wheel.

The machine is constructed to automatically swing the bed and with it the workholder and carriage relative to the grinding-wheel at the beginning of each forward and backward piston-stroke, the means for accomplishing this result being as follows: Adjustably mounted in a recess 66 in the upper side of the block 52 and in a recess 67 in the carriage 21 is a cam-plate 68 provided with a beveled wall 69 forming a cam-surface, for a purpose hereinafter explained, the upper part of the front wall of the recess, adjacent to this cam-plate, being tapered, as indicated at 70, in Figs. 7 and 8. Adjustably mounted in a slot 71 in a bar 72, carried by the standards 44 and 73, is a head 74 containing a downwardly spring-pressed plunger 75, the lower end of which extends below the bar 72 into the path of movement of the beveled surfaces 70 and 69, with which it engages, for the purpose hereinafter explained.

The operation of the machine is as follows: Assuming the machine to be in the position of rest illustrated in Fig. 1, to operate it the lever 40 is swung forward until the bell-crank 45, by gravity, engages it at its shoulder 49, thereby releasably locking the lever 40 in place. Thus, operating the lever 40 causes the fluid-pressure to enter the cylinder through the passage 34, with the result of driving the piston-rod 28 forward. Assuming the links 56 and 57 to be in the positions illustrated in Fig. 5 the movement of the rod 28 forward first collapses the knuckle, thereby permitting the spring 18 to draw the bed, carriage and work-holder away from the grinding-wheel, and then by reason of the engagement of the disk 65 with the carriage 21, the latter and the work-holder are pushed forward, the roller 53 traveling against the guide-bar 54. The limit of the forward movement of the work-holder is controlled by the adjustable rod 50, which when it engages with the depending arm 46 of the bell-crank 45 tilts the latter and releases the operating-handle, thereby causing the latter to return to normal position, with the result of shifting the valve-rod 30 to admit fluid pressure into the forward end of the cylinder through the passage 36 and exhaust the spent fluid from its opposite end through the passage 34, with the result of returning the work-holder to normal position. The head 74 and rod 50 are so adjusted with relation to the bell-crank 45 and carriage 21, respectively, that at the moment of releasing the operating-lever to reverse the movement of the piston-rod 28, the pin, having traveled upon the cam-surface 70, drops into the recess 67 in the carriage. As the piston-rod 28 starts on its return stroke the first operation is that of straightening out the links 56 and 57 to the position illustrated in Fig. 5, in which the disk 64 engages with the carriage 21, the latter being held stationary during this operation of straightening out the links, by the engagement of the pin 75 with the wall of the recess 67. By thus straightening out the links the bed 16 is swung upon its pivot 17 against the action of the spring 18, and the carriage 21 and work-holder are thus caused to be moved toward the grinding-wheel with the result of causing the pin 75, during this operation of straightening out the links, to move upon the cam-surface 69, which latter it clears by the time the links have straightened out. Thus continued movement of the piston-rod 28 causes the carriage and workholder to be moved backward by the engagement of the disk 64 with the carriage, the work during the return movement of the carriage and work-holder being forced against the grinding-wheel. The carriage and work-holder continue to move backward until the rod 28 reaches the limit of its backward stroke, when the machine stops. The work may then be removed and new work to be operated upon applied to the holder.

By shielding all bearing surfaces of the carriage and bed from access to them of water and emery the wear upon the bearings is reduced to the minimum, and thus the disadvantage of causing the operative parts to become worn and out of true, as is the result after a relatively short period of use of machines wherein these parts are not protected, is overcome.

What we claim as new and desire to secure by Letters Patent is—

1. In a grinding-machine, the combination of a grinding-wheel, a bed provided with guide-tongues on its upper surface, a carriage for moving the work against the grinding-wheel mounted on said bed in position to be guided by said guides, means of shielding the guide-tongues against access to them of water and emery discharged onto the machine by the rotation of the wheel, and means for reciprocating the carriage.

2. In a grinding-machine, the combination of a grinding-wheel, a bed provided with guide-tongues on its upper surface, a carriage for moving the work against the wheel mounted on said bed in position to be guided by said guides and having portions projecting sufficiently far beyond the guides to cause the tongues to be constantly covered and protected against access to them of water and emery discharged on to the machine by the rotation of the wheel, and means for reciprocating the carriage.

3. In a grinding-machine, the combination of a grinding-wheel, a bed provided with tongues extending longitudinally thereof along its upper surface a carriage for moving the work against the grinding-wheel provided with grooves into which the tongues extend, said carriage having portions projecting sufficiently far beyond the tongues to cause the latter to be constantly covered and protected against access to them of water and emery discharged on to the machine by the rotation of the wheel, flanges along the bed between which the carriage is reciprocably confined, and means for reciprocating the carriage.

4. In a grinding-machine, the combination of a grinding-wheel, a movable bed provided with tongues extending longitudinally thereof along its upper surface, a carriage for moving the work against the grinding-wheel provided with grooves into which the tongues extend, and means for reciprocating the carriage, said carriage being constructed to cause the bearing-surfaces between it and the bed to be constantly shielded, for the purpose set forth.

5. In a grinding-machine, the combination of a frame, a grinding-wheel journaled thereon, a swinging-bed on the frame, a carriage for moving the work to be operated on reciprocably mounted on the bed, means for reciprocating the carriage, and means for swinging the bed with reference to the grinding-wheel comprising a guide on the frame, a roller carried by the carriage and bearing against said guide and constructed and arranged to travel with the carriage and to be moved relative to it, means for moving the carriage relative to said roller, a cam movable with said roller, and a sliding-pin constructed and arranged to engage with said carriage and with said cam, for the purpose set forth.

6. In a grinding-machine, the combination of a frame and grinding-wheel journaled thereon, a swinging-bed on the frame, a carriage for moving the work to be operated on reciprocably mounted on the bed, means for reciprocating the carriage, and means for swinging the bed with reference to the grinding-wheel comprising a guide on the frame, a block slidably mounted on the carriage, a roller carried by the block and bearing against said guide and constructed and arranged to travel with the work-holder and to be moved relative to it, means for moving the carriage with relation to said block and roller, a cam carried by said block, and a pin constructed and arranged to engage with said carriage and with said cam, for the purpose set forth.

7. In a grinding-machine, the combination of a frame, a grinding-wheel journaled thereon, a swinging-bed on the frame, a carriage for moving the work to be operated on reciprocably mounted on the bed, means for reciprocating the carriage, and means for swinging the bed with relation to the grinding-wheel comprising a guide on the frame, a block slidably mounted on the carriage, a roller carried by the block and bearing against said guide and constructed and arranged to travel with the carriage and to be moved relative to it, means for moving the carriage relative to said block and roller, a second block adjustably mounted in recesses formed in said first-named block and in said carriage and provided with a cam-surface, and a sliding-pin constructed and arranged to engage with the recesses in said carriage and with said cam, for the purpose set forth.

8. In a grinding-machine, the combination of a frame, a grinding-wheel journaled thereon, a swinging-bed on the frame, a carriage for moving the work to be operated on reciprocably mounted on the bed, means for reciprocating the carriage, and means for swinging the bed with relation to the grinding-wheel comprising a guide on the frame, a roller carried by the carriage and bearing against said guide and constructed and arranged to travel with the carriage and to be moved with relation to it, means for moving the carriage relative to said roller, a cam movable with said roller, a bar rigid with said bed, and a head adjustably mounted on said bar and containing a plunger extending below said bar.

WILLIAM J. BASTIAN.
FRANK GRANITZ.

In presence of—
RALPH A. SCHAEFER,
W. T. JONES.

---

It is hereby certified that in Letters Patent No. 910,350, granted January 19, 1909, upon the application of William J. Bastian and Frank Granitz, of Chicago, Illinois, for an improvement in "Cutlery-Grinding Machines," an error appears in the printed specification requiring correction, as follows: In line 122, page 3, the word "of" should read *for*; and that the said Letters Patent should be read with this correction therein that the same may conform to the record of the case in the Patent Office.

Signed and sealed this 9th day of February, A. D. 1909.

[SEAL.]

C. C. BILLINGS,
*Acting Commissioner of Patents.* mounted on said bed in position to be guided by said guides and having portions projecting sufficiently far beyond the guides to cause the tongues to be constantly covered and protected against access to them of water and emery discharged on to the machine by the rotation of the wheel, and means for reciprocating the carriage.

3. In a grinding-machine, the combination of a grinding-wheel, a bed provided with tongues extending longitudinally thereof along its upper surface a carriage for moving the work against the grinding-wheel provided with grooves into which the tongues extend, said carriage having portions projecting sufficiently far beyond the tongues to cause the latter to be constantly covered and protected against access to them of water and emery discharged on to the machine by the rotation of the wheel, flanges along the bed between which the carriage is reciprocably confined, and means for reciprocating the carriage.

4. In a grinding-machine, the combination of a grinding-wheel, a movable bed provided with tongues extending longitudinally thereof along its upper surface, a carriage for moving the work against the grinding-wheel provided with grooves into which the tongues extend, and means for reciprocating the carriage, said carriage being constructed to cause the bearing-surfaces between it and the bed to be constantly shielded, for the purpose set forth.

5. In a grinding-machine, the combination of a frame, a grinding-wheel journaled thereon, a swinging-bed on the frame, a carriage for moving the work to be operated on reciprocably mounted on the bed, means for reciprocating the carriage, and means for swinging the bed with reference to the grinding-wheel comprising a guide on the frame, a roller carried by the carriage and bearing against said guide and constructed and arranged to travel with the carriage and to be moved relative to it, means for moving the carriage relative to said roller, a cam movable with said roller, and a sliding-pin constructed and arranged to engage with said carriage and with said cam, for the purpose set forth.

6. In a grinding-machine, the combination of a frame and grinding-wheel journaled thereon, a swinging-bed on the frame, a carriage for moving the work to be operated on reciprocably mounted on the bed, means for reciprocating the carriage, and means for swinging the bed with reference to the grinding-wheel comprising a guide on the frame, a block slidably mounted on the carriage, a roller carried by the block and bearing against said guide and constructed and arranged to travel with the work-holder and to be moved relative to it, means for moving the carriage with relation to said block and roller, a cam carried by said block, and a pin constructed and arranged to engage with said carriage and with said cam, for the purpose set forth.

7. In a grinding-machine, the combination of a frame, a grinding-wheel journaled thereon, a swinging-bed on the frame, a carriage for moving the work to be operated on reciprocably mounted on the bed, means for reciprocating the carriage, and means for swinging the bed with relation to the grinding-wheel comprising a guide on the frame, a block slidably mounted on the carriage, a roller carried by the block and bearing against said guide and constructed and arranged to travel with the carriage and to be moved relative to it, means for moving the carriage relative to said block and roller, a second block adjustably mounted in recesses formed in said first-named block and in said carriage and provided with a cam-surface, and a sliding-pin constructed and arranged to engage with the recesses in said carriage and with said cam, for the purpose set forth.

8. In a grinding-machine, the combination of a frame, a grinding-wheel journaled thereon, a swinging-bed on the frame, a carriage for moving the work to be operated on reciprocably mounted on the bed, means for reciprocating the carriage, and means for swinging the bed with relation to the grinding-wheel comprising a guide on the frame, a roller carried by the carriage and bearing against said guide and constructed and arranged to travel with the carriage and to be moved with relation to it, means for moving the carriage relative to said roller, a cam movable with said roller, a bar rigid with said bed, and a head adjustably mounted on said bar and containing a plunger extending below said bar.

WILLIAM J. BASTIAN.
FRANK GRANITZ.

In presence of—
RALPH A. SCHAEFER,
W. T. JONES.

---

It is hereby certified that in Letters Patent No. 910,350, granted January 19, 1909, upon the application of William J. Bastian and Frank Granitz, of Chicago, Illinois, for an improvement in "Cutlery-Grinding Machines," an error appears in the printed specification requiring correction, as follows: In line 122, page 3, the word "of" should read *for*; and that the said Letters Patent should be read with this correction therein that the same may conform to the record of the case in the Patent Office.

Signed and sealed this 9th day of February, A. D. 1909.

[SEAL.]

C. C. BILLINGS,
*Acting Commissioner of Patents.*

Correction in Letters Patent No. 910,350.

It is hereby certified that in Letters Patent No. 910,350, granted January 19, 1909, upon the application of William J. Bastian and Frank Granitz, of Chicago, Illinois, for an improvement in "Cutlery-Grinding Machines," an error appears in the printed specification requiring correction, as follows: In line 122, page 3, the word "of" should read *for;* and that the said Letters Patent should be read with this correction therein that the same may conform to the record of the case in the Patent Office.

Signed and sealed this 9th day of February, A. D. 1909.

[SEAL.]

C. C. BILLINGS,
*Acting Commissioner of Patents.*